United States Patent
Feng et al.

(10) Patent No.: US 11,749,793 B2
(45) Date of Patent: Sep. 5, 2023

(54) ALL-SOLID-STATE BATTERY AND PREPARATION METHOD THEREFOR

(71) Applicant: QingTao (KunShan) Energy Development Co., Ltd., Kunshan Suzhou (CN)

(72) Inventors: Yuchuan Feng, Kunshan Suzhou (CN); Zheng Li, Kunshan Suzhou (CN); Hongcai He, Kunshan Suzhou (CN); Ke Zhou, Kunshan Suzhou (CN); Dandan Wang, Kunshan Suzhou (CN); Fan Yang, Kunshan Suzhou (CN)

(73) Assignee: QingTao (Kunshan) Energy Development Co., Ltd., Kunshan Suzhou (CN)

( * ) Notice: Subject to any disclaimer, the term of this patent is extended or adjusted under 35 U.S.C. 154(b) by 0 days.

(21) Appl. No.: 17/610,618

(22) PCT Filed: May 29, 2020

(86) PCT No.: PCT/CN2020/093083
§ 371 (c)(1),
(2) Date: Nov. 11, 2021

(87) PCT Pub. No.: WO2021/174689
PCT Pub. Date: Sep. 10, 2021

(65) Prior Publication Data
US 2022/0399532 A1    Dec. 15, 2022

(30) Foreign Application Priority Data
Mar. 6, 2020 (CN) .......................... 202010149151.9

(51) Int. Cl.
| | |
|---|---|
| *H01M 10/0562* | (2010.01) |
| *H01M 10/0561* | (2010.01) |
| *H01M 4/04* | (2006.01) |
| *H01M 4/525* | (2010.01) |
| *H01M 4/62* | (2006.01) |

(Continued)

(52) U.S. Cl.
CPC ......... *H01M 4/0404* (2013.01); *H01M 4/525* (2013.01); *H01M 4/625* (2013.01);
(Continued)

(58) Field of Classification Search
None
See application file for complete search history.

(56) References Cited

U.S. PATENT DOCUMENTS

2008/0081257 A1* 4/2008 Yoshida ............ H01M 10/0562
429/209

FOREIGN PATENT DOCUMENTS

| CN | 1372705 A | 10/2002 |
|---|---|---|
| CN | 107210427 A | 9/2017 |

(Continued)

OTHER PUBLICATIONS

JP 2015/195183 (Year: 2015).*
International Search Report from PCT/CN2020/093083, dated Dec. 1, 2020.

*Primary Examiner* — Yoshitoshi Takeuchi
(74) *Attorney, Agent, or Firm* — Morse, Barnes-Brown & Pendleton, P.C.; Sean D. Detweiler, Esq.

(57) ABSTRACT

Provided are an all-solid-state battery and a preparation method thereof. The all-solid-state battery includes a positive electrode, a negative electrode, and a solid-state electrolyte located between the positive electrode and the negative electrode. The negative electrode includes a first negative electrode and a second negative electrode. The second negative electrode is located on a side of the first negative electrode. The solid-state electrolyte includes a first solid-state electrolyte and a second solid-state electrolyte. The first solid-state electrolyte is located between the positive electrode and the first negative electrode. The second solid-state electrolyte is located between the positive electrode and the second negative electrode. The roughness of (Continued)

the second solid-state electrolyte is greater than the roughness of the first solid-state electrolyte.

13 Claims, 1 Drawing Sheet

(51) Int. Cl.
*H01M 4/66* (2006.01)
*H01M 4/02* (2006.01)
(52) U.S. Cl.
CPC ....... *H01M 4/661* (2013.01); *H01M 10/0562* (2013.01); *H01M 2004/027* (2013.01); *H01M 2004/028* (2013.01); *H01M 2300/0071* (2013.01)

(56) References Cited

FOREIGN PATENT DOCUMENTS

| CN | 110416629 A | 11/2019 | |
|---|---|---|---|
| CN | 110495038 A | 11/2019 | |
| CN | 111009682 A | 4/2020 | |
| JP | 2014102982 A | 6/2014 | |
| JP | 2015/195183 | * 11/2015 | ........ H01M 10/0562 |
| JP | 2016035867 A | 3/2016 | |
| JP | 2019140042 A | 8/2019 | |
| JP | 2019192610 A | 10/2019 | |

* cited by examiner

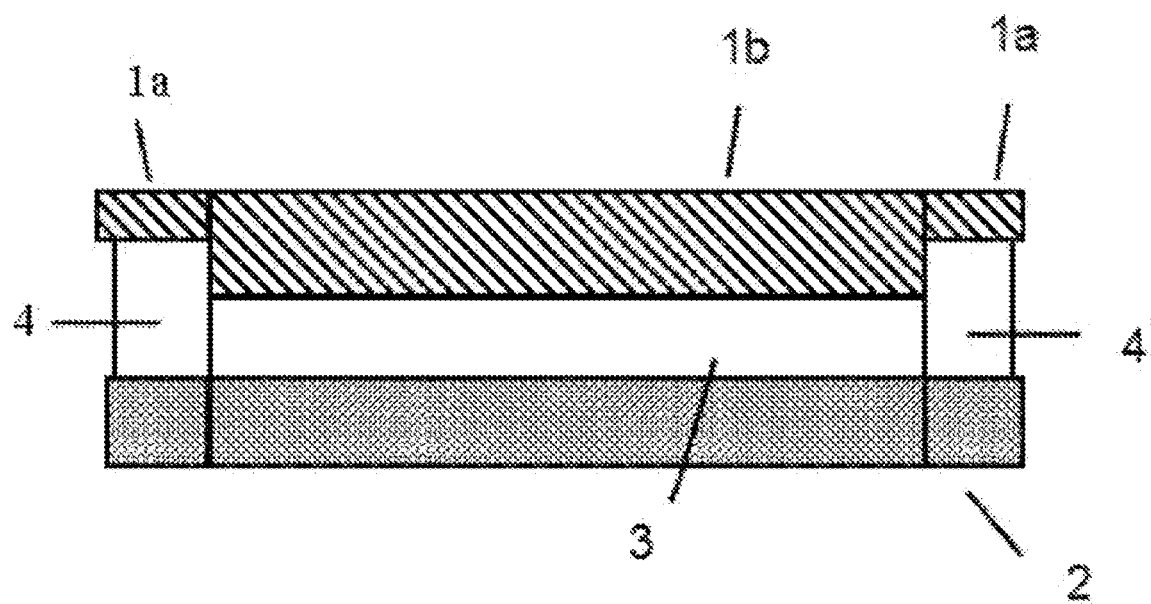

ALL-SOLID-STATE BATTERY AND PREPARATION METHOD THEREFOR

RELATED APPLICATIONS

This application is a national stage filing under 35 U.S.C. 371 of International Application No. PCT/CN2020/093083, filed May 29, 2020, which claims priority to Chinese Application No. 202010149151.9, filed Mar. 6, 2020. The entire teachings of said applications are incorporated by reference herein.

TECHNICAL FIELD

The present application belongs to the technical field of energy storage materials, and relates to a battery and a preparation method thereof, for example, an all-solid-state battery and a preparation method thereof.

BACKGROUND

Lithium-ion batteries, since commercialized, have been widely used in power supplies of various portable consumer electronic products due to the advantages of high energy density, high working voltage, long cycle life, no memory effect, environmental friendliness, and flexibility in the design of size and shape according to actual needs. The new energy vehicle market has great prospects, and as an important chemical power source, lithium-ion batteries are widely used in mobile communication equipment, electric tools, electric bicycles, and so on. The demand for lithium-ion batteries and related supporting industries is increasing.

At present, liquid electrolyte lithium batteries have been widely used, but liquid electrolyte lithium batteries have the problems of low energy density and poor safety. Therefore, the solid-state battery is regarded as the next generation of lithium batteries with industrial value. However, the interface is the biggest problem for the popularization and use of solid-state lithium batteries. In actual use, the expansion of the negative electrode will cause the detachment of the solid-state electrolyte and the negative electrode.

JP2015195183A discloses an all-solid lithium-ion secondary battery in which the maximum height roughness Rz of at least one of an interface between the positive electrode active material layer and the inorganic solid electrolytic layer, or an interface between the negative electrode active material layer and the inorganic solid electrolytic layer is 1.5 μm to 5 μm.

JP2015153507A discloses an all-solid battery which includes a positive electrode active material layer, a negative electrode active material layer of layer-like amorphous $Li_4Ti_5O_{12}$ whose ten-point average roughness Rz is 500 nm or less, and a solid electrolyte layer held between the positive electrode active material layer and the negative electrode active material layer.

CN110383559A discloses the impact of the roughness of the solid-state electrolyte in the solid sodium-ion battery on the battery performance and believes that the improvement of roughness will improve the adhesion between the solid-state electrolyte and the active material layer and then further improve the overall performance of the battery.

However, according to the existing research results, the adjustment of roughness cannot completely solve the contradiction among adhesion, short circuit, and impedance. The present application aims to provide a solution to the problem that the negative electrode is easily detached from the solid-state electrolyte in the existing art.

SUMMARY

The summary of the subject matter described herein is given below in detail. This summary is not intended to limit the scope of the claims.

The object of the present application is to provide an all-solid-state battery and a preparation method thereof. The all-solid-state battery provided by the present application can solve the contradiction among adhesion, short circuit, and impedance existing in the existing all-solid-state battery.

To achieve the object, the present application adopts the following solutions.

In a first aspect, the present application provides an all-solid-state battery. The all-solid-state battery includes a positive electrode, a negative electrode, and a solid-state electrolyte located between the positive electrode and the negative electrode. The negative electrode includes a first negative electrode and a second negative electrode, and the second negative electrode is located on a side of the first negative electrode. The solid-state electrolyte includes a first solid-state electrolyte and a second solid-state electrolyte. The first solid-state electrolyte is located between the positive electrode and the first negative electrode, the second solid-state electrolyte is located between the positive electrode and the second negative electrode, and the roughness of the second solid-state electrolyte is greater than the roughness of the first solid-state electrolyte.

In the all-solid-state battery provided by the present application, a first negative electrode and a second negative electrode are disposed, the solid-state electrolyte is divided into a first solid-state electrolyte and a second-state electrolyte, and the roughness of the first solid-state electrolyte corresponding to the first negative electrode is small, thereby reducing the problems that the battery is easy to short circuit and the overall impedance of the battery is large due to the large roughness of the solid-state electrolyte. Further, the roughness of the second solid-state electrolyte corresponding to the second negative electrode is large, thereby avoiding the problems that the roughness of the solid-state electrolyte is too small and the adhesion between the electrodes and the solid-state electrolyte is not strong in the existing design of the all-solid-state battery.

In the present application, the dilemma of the solid-state electrolyte roughness design in the existing art is overcome through the combination design of the first negative electrode, the second negative electrode, the first solid-state electrolyte, and the second solid-state electrolyte.

In the present application, the roughness may be measured through the arithmetic average roughness Ra, the maximum height Ry, the ten-point average roughness Rz, and so on. Optionally, the roughness may be measured by using the arithmetic average roughness Ra according to the test standards GB/T1031-2009, and the interface between the electrode layer-solid-state electrolyte layer 23 may be photographed by scanning electron microscopy (SEM). Then, the surface roughness of the positive electrode, the negative electrode, and the solid-state electrolyte is measured by the image analysis software.

Optional technical solutions of the present application are set forth below and are not intended to limit the technical solutions of the present application. Technical objects and beneficial effects of the present application can be better achieved through the optional technical solutions set forth below.

As an optional technical solution of the present application, the second negative electrodes are located on both sides of the first negative electrode, and optionally, the second negative electrodes are located on opposite sides of the first negative electrode.

Optionally, the first negative electrode is connected with the second negative electrodes.

Optionally, the cross-sectional area of the first negative electrode is larger than the cross-sectional area of each of the second negative electrodes.

Optionally, the thickness of the first negative electrode is greater than the thickness of each of the second negative electrodes.

Optionally, the thickness of the first solid-state electrolyte is less than the thickness of each of the second solid-state electrolytes.

The above design is adopted because, although the roughness of the second solid-state electrolyte is greater than the roughness of the first solid-state electrolyte, since the thickness of the second solid-state electrolyte is large, the case in which dendrites of the negative electrode puncture the solid-state electrolyte is avoided.

Since the cross-sectional area of the first negative electrode is larger than the cross-sectional area of the second negative electrode, the distance between the second negative electrode and the positive electrode is greater than the distance between the first negative electrode and the positive electrode. Therefore, the unfavorable factor of short circuit easily caused by the large roughness of the second electrolyte is partially offset because, with the increase of the distance between the second negative electrode and the positive electrode, the possibility of lithium dendrites passing through the solid-state electrolyte becomes low while the large roughness brings the beneficial effect of the increase of the adhesion between the solid-state electrolyte and the negative electrode.

Optionally, the difference between the thickness of the second negative electrode and the thickness of the first negative electrode is in the range of 20% to 400% of the thickness of the first solid-state electrolyte. As an operable solution, when the battery performance is emphasized, the numerical range may be 20% to 150%. As another operable solution, when the safety performance is emphasized, the numerical range may be 200% to 400%. The selection of the numerical range may be adjusted according to the needs of the battery.

It is to be understood by technicians that, in general, the thickness difference between the second negative electrode and the first negative electrode should be equal to the thickness difference between the first solid-state electrolyte and the second solid-state electrolyte, and in principle, there is only a slight difference within the error range.

In some cases, the thickness difference between the second negative electrode and the first negative electrode may not be equal to the thickness difference between the first solid-state electrolyte and the second solid-state electrolyte. For example, there are other components in the portions where the first or second solid-state electrolyte is in contact with the first and second negative electrodes, which affects the thickness of the first and second solid-state electrolytes and the first and second negative electrodes.

It is to be understood by technicians that the first and second negative electrodes and the first and second solid-state electrolytes are all one whole, and the thickness of the coatings or doped components on the first and second negative electrodes or the first and second solid-state electrolytes should be regarded as the overall thickness of the first and second negative electrodes or the first and second solid-state electrolytes. For example, when a coating is provided on the negative electrode, the thickness of the coating should be understood as a part of the overall thickness of the corresponding negative electrode. The above solution should not be regarded to be excluded from the scope of protection of the present application.

It is to be further described that, in terms of the difference between the surface roughness of the first solid-state electrolyte and the roughness of the second solid-state electrolyte, the safety and adhesion strength should be considered comprehensively because, within a reasonable range, the large roughness increases the adhesion strength between the solid-state electrolyte and the negative electrode, but too large roughness will promote the formation of lithium dendrites, which will lead to short circuit, while too small roughness, although the safety is guaranteed, weakens the adhesion and then causes the detachment of the solid-state electrolyte and the negative electrode. Therefore, the design of the roughness of the first solid-state electrolyte is mainly satisfied with the safety requirements while the design of the roughness of the second solid-state electrolyte is mainly concerned with the adhesion because the distance between the second negative electrode and the positive electrode is farther than the distance between the first negative electrode and the positive electrode, the safety can still be guaranteed even if the roughness of the second solid-state electrolyte is increased.

Therefore, in the present application, the design that the surface roughness of the second solid-state electrolyte is greater than the surface roughness of the first solid-state electrolyte is favorable. In an embodiment, the roughness may be adjusted according to the actual formulation system. Optionally, the numerical range of the surface roughness of the first solid-state electrolyte is 0.1 µm to 30 µm, and the numerical range of the surface roughness of the second solid-state electrolyte is 0.1 µm to 50 µm, optionally, 10 µm to 15 µm.

However, it is to be noted that the roughness of the first solid-state electrolyte cannot be as low as possible. Experiments have proved that for solid-state electrolytes, too low roughness will promote the formation of lithium dendrites, which does not facilitate safety.

As a technical solution of the present application, the roughness of the first solid-state electrolyte and the roughness of the second solid-state electrolyte are both greater than the surface roughness of the negative electrodes which are in contact with the first solid-state electrolyte and the second solid-state electrolyte, respectively, and the difference between the roughness of the second solid-state electrolyte and the roughness of the second negative electrode is greater than the difference between the roughness of the first solid-state electrolyte and the roughness of the first negative electrode.

Optionally, the difference between the roughness of the second solid-state electrolyte and the roughness of the second negative electrode is 100% to 500% greater than the difference between the roughness of the first solid-state electrolyte and the roughness of the first negative electrode, such as 100%, 200%, 300%, 400% or 500%; optionally, the difference between the roughness of the second solid-state electrolyte and the roughness of the second negative electrode is 200% to 300% greater than the difference between the roughness of the first solid-state electrolyte and the roughness of the first negative electrode.

Since the existing electrodes and the electrodes and the solid-state electrolytes are usually bonded by the powder pressing process, the appropriate roughness difference between the electrodes and the solid-state electrolytes facilitates the improvement of the adhesion strength, but the excessive roughness difference will affect the adhesion strength instead. Meanwhile, in the present application, since the adhesion between the first solid-state electrolyte and the negative electrode is different from the adhesion between the second solid-state electrolyte and the negative electrode, in the actual use, with the expansion of the negative electrode, stress reserved between the negative electrode and the first and second solid-state electrolytes will gradually accumulate. Therefore, in the present application, optionally, the difference between the roughness of the second solid-state electrolyte and the roughness of the second negative electrode is 100% to 500% greater than the difference between the roughness of the first solid-state electrolyte and the roughness of the first negative electrode. Optionally, in addition to the condition that the difference between the roughness of the second solid-state electrolyte and the roughness of the second negative electrode is 100% to 500% greater than the difference between the roughness of the first solid-state electrolyte and the roughness of the first negative electrode, the roughness of the first and second solid-state electrolytes also needs to satisfy the condition that the roughness of the second solid-state electrolyte is 30% to 150% greater than that of the first solid-state electrolyte. In this way, the adhesion and stress accumulation between the solid-state electrolyte and the negative electrode can be properly treated so that stress concentration will not occur within the service life of the battery.

Optionally, the difference between the roughness of the second solid-state electrolyte and the roughness of the second negative electrode is 200% to 300% greater than the difference between the roughness of the first solid-state electrolyte and the roughness of the first negative electrode, and the roughness of the second solid-state electrolyte is 50% to 100% greater than the roughness of the first solid-state electrolyte, which further improves the safety of the battery.

Optionally, the roughness of the second negative electrode is greater than the roughness of the first negative electrode.

As an optional technical solution of the present application, the materials of current collectors in the positive and negative electrodes independently include any one or a combination of at least two of aluminum, copper, nickel or zinc.

In the present application, optionally, the current collector in the positive electrode is made of aluminum, and the current collector in the negative electrode is made of copper.

As an optional technical solution of the present application, the positive electrode active material layer of the positive electrode includes a positive electrode active material.

Optionally, the positive electrode active material includes any one or a combination of at least two of $LiCoO_2$, $LiMnO_2$, $LiNiO_2$, $LiVO_2$, $LiNi_{1/3}Co_{1/3}Mn_{1/3}O_2$, $LiMn_2O_4$, $LiTi_5O_{12}$, $Li(Ni_{0.5}Mn_{1.5})O_4$, $LiFePO_4$, $LiMnPO_4$, $LiNiPO_4$, $LiCoPO_4$ or $LiNbO_3$.

$LiCoO_2$, $LiMnO_2$, $LiNiO_2$, $LiVO_2$, and $LiNi_{1/3}Co_{1/3}Mn_{1/3}O_2$ each have a rock salt layered structure, $LiMn_2O_4$, $LiTi_5O_{12}$, and $Li(Ni_{0.5}Mn_{1.5})O_4$ each have a spinel structure, and $LiFePO_4$, $LiMnPO_4$, $LiNiPO_4$, $LiCoPO_4$, and $LiNbO_3$ each have an olivine structure. Meanwhile, known coating forms may also be used, such as $LiNbO_3$.

Optionally, the positive electrode active material layer further includes any one or a combination of at least two of a solid-state electrolyte material, a conductive material or an adhesive material.

Optionally, the solid-state electrolyte material includes a sulfide solid-state electrolyte material and/or an oxide solid-state electrolyte material.

Optionally, the conductive material includes any one or a combination of at least two of acetylene black, conductive carbon black, ketjen black or carbon fiber.

Optionally, the adhesive material includes any one or a combination of at least two of polyvinylidene fluoride, carboxymethylcellulose sodium or styrene-butadiene rubber.

Optionally, the thickness of the positive electrode active material layer is 1 μm to 500 μm, such as 1 μm, 5 μm, 10 μm, 50 μm, 100 μm, 200 μm, 300 μm, 400 μm, and 500 μm, and optionally is 50 μm to 200 μm.

Optionally, the surface of the positive electrode active material layer is coated with a coating.

The purpose of the coating on the surface of the positive electrode active material layer is to inhibit the reaction between the positive electrode active material and the solid-state electrolyte material.

Optionally, the material of the coating includes any one or a combination of at least two of $LiNbO_3$, $Li_3PO_4$ or LiPON.

Optionally, the thickness of the coating is 1 nm to 20 nm, such as 1 nm, 2 nm, 5 nm, 8 nm, 10 nm, 12 nm, 14 nm, 16 nm, 18 nm, and 20 nm.

Particularly optionally, corresponding to the first negative electrode and the second negative electrode, the positive electrode is also divided into a first positive electrode and a second positive electrode, where the first positive electrode is disposed opposite to the first negative electrode, and the second positive electrode is disposed opposite to the second negative electrode.

The thickness of the second positive electrode is less than the thickness of the first positive electrode by adjusting the thickness of the first positive electrode and the second positive electrode, so as to correspond to the thickness difference between the first negative electrode and the second negative electrode, thereby overcoming the problem of lithium plating.

As an optional technical solution of the present application, the negative electrode active material layer of the negative electrode includes a negative electrode active material.

Optionally, the negative electrode active material includes any one or a combination of at least two of a metallic active material, a carbon active material or an oxide active material.

Optionally, the metallic active material includes any one or a combination of at least two of Si, Sn, In, Si—Al alloy or Si—In alloy.

Optionally, the carbon active material includes any one or a combination of at least two of graphite, hard carbon or soft carbon.

Optionally, the oxide active material includes $Li_4Ti_5O_{12}$.

Optionally, the negative electrode active material layer further includes any one or a combination of at least two of a solid-state electrolyte material, a conductive material or an adhesive material.

Optionally, the solid-state electrolyte material includes a sulfide solid-state electrolyte material and/or an oxide solid-state electrolyte material.

Optionally, the conductive material includes any one or a combination of at least two of acetylene black, conductive carbon black, ketjen black or carbon fiber.

Optionally, the adhesive material includes any one or a combination of at least two of polyvinylidene fluoride, carboxymethylcellulose sodium or styrene-butadiene rubber.

Optionally, the thickness of the negative electrode active material layer is 1 μm to 500 μm, such as 1 μm, 5 μm, 10 μm, 50 μm, 100 μm, 200 μm, 300 μm, 400 μm, and 500 μm, and optionally is 50 μm to 200 μm.

Optionally, the first negative electrode and the second negative electrode share the same current collector.

As an operation solution, the second negative electrode is provided with an active material layer, and optionally, the compositions of the active materials of the first negative electrode and the second negative electrode may be the same or different.

On the basis of the arrangement of the active material layer on the second negative electrode, the thickness of the second negative electrode may be adjusted through the thickness of the active material layer or the thickness of the foil. For example, the thickness of the foil on the second negative electrode may be the same as the thickness of the foil on the first negative electrode, and the thickness of the second negative electrode is less than the thickness of the first negative electrode by making the thickness of the active material layer on the second negative electrode different from the thickness of the active material layer on the first negative electrode. On the other hand, the thickness of the active material layer on the second negative electrode may be the same as the thickness of the active material layer on the first negative electrode, and the thickness of the second negative electrode is less than the thickness of the first negative electrode by adjusting the thickness of the foil. The overall thickness of the second negative electrode is less than the thickness of the first negative electrode by simultaneously adjusting the thickness of the active material layer and the foil. Even, the overall thickness of the second negative electrode may be less than the thickness of the first negative electrode by making the thickness of one of the foil or the active material layer of the second negative electrode greater than that of the first negative electrode and making the thickness of the other less than that of the first negative electrode.

In a word, any reasonable technical solution that makes the thickness of the second negative electrode less than the thickness of the first negative electrode is feasible, as long as the normal operation of the battery is ensured.

As another operation solution, the second negative electrode may not be provided with an active material layer, and additionally, the positive electrode portion corresponding to the second negative electrode may not be provided with an active material layer.

As an optional technical solution, the material of the solid-state electrolyte located between the positive electrode and the negative electrode includes any one or a combination of at least two of a sulfide solid-state electrolyte material, an oxide solid-state electrolyte material or a polymer solid-state electrolyte material.

In the present application, the material of the solid-state electrolyte located between the positive electrode and the negative electrode may be a crystalline material or an amorphous material. In addition, the solid-state electrolyte may be glass or crystallized glass.

Optionally, the thickness of the first solid-state electrolyte between the positive electrode and the negative electrode is 10 μm to 300 μm, such as 10 μm, 50 μm, 100 μm, 200 μm, and 300 μm.

Optionally, the thickness of the first solid-state electrolyte between the positive electrode and the negative electrode is 20 μm to 60 μm. This range not only satisfies the trend of lightness and thinness of the solid-state electrolyte but also inhibits the short circuit between the positive electrode and the negative electrode caused by dendrites.

In a second aspect, the present application provides a method of preparing the all-solid-state battery described in the first aspect. The method includes the following steps:

(1) mixing positive electrode active material layer raw materials, and coating the mixed raw materials on a positive current collector to obtain a positive electrode;

(2) coating a solid-state electrolyte slurry on the positive electrode to form a first solid-state electrolyte and a second solid-state electrolyte, wherein a roughness of the second solid-state electrolyte is greater than a roughness of the first solid-state electrolyte, so as to obtain a positive electrode-solid-state electrolyte composite pole piece; and (3) mixing negative active material layer raw materials, and coating the mixed raw materials on a negative current collector to obtain a first negative electrode and a second negative electrode, and bonding the positive electrode-solid-state electrolyte composite pole piece obtain in step (2) with the first negative electrode and the second negative electrode to obtain the all-solid-state battery.

As an optional technical solution of the present application, step (1) further includes the following step: a coating is coated on a positive electrode active material layer of the positive electrode. The purpose of the above operation is to form a coating layer on the surface of the positive electrode active material layer and inhibit the reaction between the positive electrode active material and the solid-state electrolyte material.

Optionally, in step (2), the method to make the roughness of the second solid-state electrolyte greater than the roughness of the first solid-state electrolyte is to select a material type and/or a surface treatment.

In the present application, a solid-state electrolyte is coated on the positive electrode and then the positive electrode becomes the carrier of the solid-state electrolyte so that the roughness of the solid-state electrolyte is easily adjusted. In the existing art, the adjustment of the roughness of the solid-state electrolyte is difficult because due to the requirement of lightness and thinness of the electrolyte, the thickness of the solid-state electrolyte is small, which has high requirements for the conventional treatment process. In the present application, the effect of adjusting the solid-state electrolyte can be achieved by adjusting the combination sequence of the solid-state electrolyte and the electrode.

For the polymer solid-state electrolyte, when the method of selecting material types is used, the viscosity of polymer can be adjusted by using materials with different molecular weights, and then the roughness can be adjusted.

Optionally, the surface treatment includes any one or a combination of at least two of sandblasting, grinding, rolling or coating.

Optionally, the preparation method further includes the following step: roughness adjustment is performed on the positive electrode obtained in step (1) and/or the first negative electrode and the second negative electrode obtained in step (3).

In general, the roughness control of the positive and negative electrodes has the following rules:

1. The smaller the particle sizes (average particle size D50) of the positive electrode active material and the negative electrode active material, the smaller the surface roughness of the positive electrode layer and the negative electrode layer.

2. The smaller the viscosity of positive and negative adhesives, the smaller the surface roughness of positive and negative layers.

3. The increase of the sintering pressure can reduce the surface roughness of both the positive layer and negative layer.

As a further optional technical solution of the preparation method of the present application, the method includes the following steps:

(1) mixing a positive electrode active material, a conductive material, and an adhesive material, coating the mixed materials on a positive electrode current collector aluminum foil by a coating machine, and drying to obtain a positive electrode;

(2) coating a solid-state electrolyte slurry on the positive electrode, drying the coated positive electrode to form a first solid-state electrolyte and a second solid-state electrolyte, and making a roughness of the second solid-state electrolyte greater than a roughness of the first solid-state electrolyte through surface treatment to obtain a positive electrode-solid-state electrolyte composite pole piece; and (3) mixing a negative active material and an adhesive, coating the mixed materials on a copper foil by a coating machine, drying to obtain a first negative electrode and a second negative electrode, and bonding the positive electrode-solid-state electrolyte composite pole piece obtain in step (2) with the first negative electrode and the second negative electrode to obtain the all-solid-state battery.

Compared with the existing art, the present application has the following beneficial effects:

(1) In the all-solid-state battery provided by the present application, a first negative electrode and a second negative electrode are disposed, the solid-state electrolyte is divided into two parts: a first solid-state electrolyte and a second-state electrolyte, and the roughness of the first solid-state electrolyte corresponding to the main body (the first negative electrode) of the battery is small, thereby reducing the problems that the battery is easy to short circuit and the overall impedance of the battery is large due to the large roughness of the solid-state electrolyte. Further, the roughness of the second solid-state electrolyte corresponding to the second negative electrode is large, thereby avoiding the problems that the roughness of the solid-state electrolyte is too small and the adhesion between the electrodes and the solid-state electrolyte is not strong in the existing design of the all-solid-state battery. In the present application, the dilemma of the solid-state electrolyte roughness design in the existing art is overcome through the combination design of the first negative electrode, the second negative electrode, the first solid-state electrolyte, and the second solid-state electrolyte. The initial charge/discharge efficiency of the all-solid-state battery provided by the present application can reach 90%, and the capacity retention rate after 30 charge and discharge cycles can reach 97.3%.

(2) The preparation method provided by the present application is simple to operate, low in cost, and convenient for large-scale production in the industry.

Other aspects can be understood after the detailed description and the drawings are read and understood.

BRIEF DESCRIPTION OF DRAWINGS

FIG. 1 is a structural diagram of an all-solid-state battery provided in Example 1 of the present application, where 1a—second negative electrode, 1b—first negative electrode, 2—positive electrode, 3—first solid-state electrolyte, and 4—second solid-state electrolyte.

DETAILED DESCRIPTION

To better illustrate the present application and to facilitate the understanding of the solutions of the present application, the present application is further described in detail below. The examples described below are merely simple examples of the present application and not intended to represent or limit the scope of the present application. The scope of the present application is defined by the claims.

Typical but non-limiting examples of the present application are described below.

Example 1

This example provides an all-solid-state battery. As shown in FIG. 1 which is a structural diagram of the all-solid-state battery, the all-solid-state battery includes a positive electrode 2, a negative electrode, and a solid-state electrolyte located between the positive electrode and the negative electrode. The negative electrode includes a first negative electrode 1b and two second negative electrodes 1a. The two second negative electrodes 1a are located on the opposite sides of the first negative electrode 1b and connected with the first negative electrode 1b. The solid-state electrolyte includes a first solid-state electrolyte 3 and two second solid-state electrolytes 4. The first solid-state electrolyte 3 is located between the positive electrode 2 and the first negative electrode 1b. The two second solid-state electrolytes 4 are each located between the positive electrode 2 and each of the two second negative electrodes 1a, and each of the two second negative electrodes 1a corresponds to one of the two second solid-state electrolytes 4. The roughness of each of the two second solid-state electrolytes 4 is greater than the roughness of the first solid-state electrolyte 3.

There are two second negative electrodes 1a, each of which has a roughness of 8 μm and a thickness of 120 μm. The first negative electrode has a roughness of 10 μm and a thickness of 150 μm.

The current collectors of the first and second negative electrodes are copper foil, and the non-electroactive materials in the negative electrode active material layer on the current collector is composed of 60 wt % carbon fiber and 40 wt % polytetrafluoroethylene.

The current collector of the positive electrode is aluminum foil, the positive electrode active material layer on the current collector is composed of 50 wt % of $LiCoO_2$, 20 wt % of conductive carbon black, and 30 wt % of polytetrafluoroethylene, and the thickness of the positive electrode active material layer is 150 μm.

The material of the first solid-state electrolyte is 50 wt % of $Li_7La_3Zr_2O_{12}$, 30 wt % of lithium perchlorate, and 20 wt % of polyethylene oxide, and the first solid-state electrolyte has a thickness of 100 μm and a roughness of 12 μm. The material of each of the two second solid-state electrolytes is 50 wt % of $Li_7La_3Zr_2O_{12}$, 30 wt % of lithium perchlorate, and 20 wt % of polyethylene oxide, and each of the two second solid-state electrolytes has a thickness of 150 μm and a roughness of 18 μm (the difference between the roughness of each of the two second solid-state electrolytes and the roughness of each of the two second negative electrodes is 150% greater than the difference between the roughness of the first solid-state electrolyte and the roughness of the first negative electrode).

This example further provides a method of preparing the all-solid-state battery described above. The method includes the following steps.

An aluminum foil was provided, the formulary amount of positive electrode active material $LiCoO_2$, a conductive carbon black, and an adhesive solution dissolved in N-methylpyrrolidone were mixed to obtain a positive electrode active layer slurry, and then the positive electrode active layer slurry was coated on the outer surface of the aluminum foil by a coating machine and dried to obtain a positive electrode 2.

A solid-state electrolyte slurry was coated on the positive electrode 2, where on the portion corresponding to the first negative electrode 1b, the slurry was coated with a thickness of 100 μm to form a first solid-state electrolyte 3, and on the portion corresponding to the second negative electrode 1a, the slurry was coated with a thickness of 150 μm to form a second solid-state electrolyte 4. After the coating was completed, the slurry was dried, and the surfaces of the first solid-state electrolyte 3 and the second solid-state electrolyte 4 were respectively treated by a conventional sanding process so that the roughness of the second solid-state electrolyte 4 was greater than the roughness of the first solid-state electrolyte 3, so as to obtain a positive electrode-solid-state electrolyte composite pole piece.

A copper foil was provided, the formulary amount of a carbon material and an adhesive material are mixed to form a negative electrode coating layer composition, the negative electrode coating layer composition was coated on the corresponding copper foil by a coating method, where the thickness of the second negative electrode 1a was 50 μm thinner than the thickness of the first negative electrode 1b, and after the coating was completed, the composition was dried to obtain a negative electrode piece.

The positive-solid-state electrolyte composite pole piece and the negative pole piece were bonded to obtain an all-solid-state lithium-ion battery.

The performance test results of the all-solid-state battery provided in this example are shown in Table 1, and the adhesion after 100 cycles is shown in Table 2.

Example 2

The all-solid-state battery provided in this example is the same as the all-solid-state battery provided in Example 1 except that the roughness of each second negative electrode 1a is 8 μm, the roughness of the first negative electrode 1b is 8 μm, the roughness of each second solid-state electrolyte 4 is 22 μm, and the roughness of the first solid-state electrolyte 3 is 15 μm (the difference between the roughness of each second solid-state electrolyte 4 and the roughness of each second negative electrode 1a is 100% greater than the difference between the roughness of the first solid-state electrolyte 3 and the roughness of the first negative electrode 1b).

The performance test results of the all-solid-state battery provided in this example are shown in Table 1, and the adhesion after 100 cycles is shown in Table 2.

Example 3

The all-solid-state battery provided in this example is the same as the all-solid-state battery provided in Example 1 except that the roughness of each second negative electrode 1a is 8 μm, the roughness of the first negative electrode 1b is 8 μm, the roughness of each second solid-state electrolyte 4 is 32 μm, and the roughness of the first solid-state electrolyte 3 is 12 μm (the difference between the roughness of each second solid-state electrolyte 4 and the roughness of each second negative electrode 1a is 500% greater than the difference between the roughness of the first solid-state electrolyte 3 and the roughness of the first negative electrode 1b).

The performance test results of the all-solid-state battery provided in this example are shown in Table 1, and the adhesion after 100 cycles is shown in Table 2.

Example 4

The all-solid-state battery provided in this example is the same as the all-solid-state battery provided in Example 1 except that the roughness of each second negative electrode 1a is 8 μm, the roughness of the first negative electrode 1b is 8 μm, the roughness of each second solid-state electrolyte 4 is 48 μm, and the roughness of the first solid-state electrolyte 3 is 12 μm (the difference between the roughness of each second solid-state electrolyte 4 and the roughness of each second negative electrode 1a is 900% greater than the difference between the roughness of the first solid-state electrolyte 3 and the roughness of the first negative electrode 1b).

The performance test results of the all-solid-state battery provided in this example are shown in Table 1, and the adhesion after 100 cycles is shown in Table 2.

Example 5

The all-solid-state battery provided in this example is the same as the all-solid-state battery provided in Example 1 except that the roughness of each second negative electrode 1a is 8 μm, the roughness of the first negative electrode 1b is 8 μm, the roughness of each second solid-state electrolyte 4 is 14 μm, and the roughness of the first solid-state electrolyte 3 is 17 μm (the difference between the roughness of each second solid-state electrolyte 4 and the roughness of each second negative electrode 1a is 50% greater than the difference between the roughness of the first solid-state electrolyte 3 and the roughness of the first negative electrode 1b).

The performance test results of the all-solid-state battery provided in this example are shown in Table 1, and the adhesion after 100 cycles is shown in Table 2.

Comparative Example 1

The all-solid-state battery provided in this comparative example is the same as the all-solid-state battery provided in Example 1 in structure, composition, and parameters such as roughness and thickness except that the second negative electrode 1a and the second solid-state electrolyte 4 are absent.

The performance test results of the all-solid-state battery provided in this comparative example are shown in Table 1, and the adhesion after 100 cycles is shown in Table 2.

Test Method

At 60° C. to 80° C., the rate performance of the battery was tested with a charging rate of 5 C, a discharging rate of 10 C, and a voltage ranging from 3 V to 4.3 V.

The adhesion between the solid-state electrolyte of the battery and the first and second negative electrodes and the adhesion between the first solid-state electrolyte and the second solid-state electrolyte were observed after the battery was subjected to 100 charge and discharge cycles.

The performance test results of the battery are shown in Table 1.

TABLE 1

| | Initial charge/ discharge efficiency (%) | Capacity retention rate after 10 charge and discharge cycles (%) | Capacity retention rate after 20 charge and discharge cycles (%) | Capacity retention rate after 30 charge and discharge cycles (%) |
|---|---|---|---|---|
| Example 1 | 90 | 99.5 | 98.6 | 97.3 |
| Example 2 | 90.2 | 99.3 | 98.4 | 97.2 |
| Example 3 | 90.1 | 99.1 | 98.3 | 97.5 |
| Example 4 | 89.9 | 99.2 | 98.1 | 97.3 |
| Example 5 | 90.3 | 96.9 | 97.3 | 96.8 |
| Comparative Example 1 | 88.92 | 96.3 | 96 | 95.7 |

The adhesion after 100 cycles is shown in Table 2.

TABLE 2

| | Adhesion between the solid-state electrolyte and the negative electrode | Adhesion between the first solid-state electrolyte and the second solid-state electrolyte |
|---|---|---|
| Example 1 | Well bonded | Well bonded |
| Example 2 | Well bonded | Well bonded |
| Example 3 | Well bonded | Well bonded |
| Example 4 | Well bonded | Stress existed |
| Example 5 | Well bonded | Well bonded |

In summary, as can be seen from the examples and comparative example described above, in the all-solid-state battery provided by Examples 1 to 5, a first negative electrode and a second negative electrode are disposed, the solid-state electrolyte is divided into two parts: a first solid-state electrolyte and a second-state electrolyte, and the roughness of the first solid-state electrolyte corresponding to the main body (the first negative electrode) of the battery is small, thereby reducing the problems that the battery is easy to short circuit and the overall impedance of the battery is large due to the large roughness of the solid-state electrolyte. Further, the roughness of the second solid-state electrolyte corresponding to the second negative electrode is large, thereby avoiding the problems that the roughness of the solid-state electrolyte is too small and the adhesion between the electrodes and the solid-state electrolyte is not strong in the existing design of the all-solid-state battery. In the present application, the dilemma of the solid-state electrolyte roughness design in the existing art is overcome through the combination design of the first negative electrode, the second negative electrode, the first solid-state electrolyte, and the second solid-state electrolyte.

However, in the all-solid-state battery provided in Example 4, the difference between the roughness of the second solid-state electrolyte and the roughness of the second negative electrode is much greater than the difference between the roughness of the first solid-state electrolyte and the roughness of the first negative electrode, resulting in adhesion problems in the first and second solid-state electrolytes and potential safety problems.

In the all-solid-state battery provided in Example 5, the difference between the roughness of the second solid-state electrolyte and the roughness of the second negative electrode is too little greater than the difference between the roughness of the first solid-state electrolyte and the roughness of the first negative electrode. Although the first solid-state electrolyte and the second solid-state electrolyte are well bonded, the performance of the all-solid-state battery is significantly poorer than the performance of the all-solid-state batteries in Examples 1 to 4 and slightly better than the performance of the all-solid-state battery in the comparative example.

In Comparative Example 1, there is no second negative electrode and second solid-state electrolyte, resulting in low initial charge/discharge efficiency and cycle capacity retention because, with the increase of cycles, the adhesion between the electrode and the solid-state electrolyte becomes poor, and the impedance increases, which affects the performance of the battery.

The applicant has stated that although the detailed process equipment and flows of the present application are described through the examples described above, the present application is not limited to the detailed process equipment and flows described above, which means that the implementation of the present application does not necessarily depend on the detailed process equipment and flows described above.

What is claimed is:

1. An all-solid-state battery, comprising a positive electrode, a negative electrode, and a solid-state electrolyte located between the positive electrode and the negative electrode, wherein the negative electrode comprises a first negative electrode and a second negative electrode, the second negative electrode is located on a side of the first negative electrode, the solid-state electrolyte comprises a first solid-state electrolyte and a second solid-state electrolyte, the first solid-state electrolyte is located between the positive electrode and the first negative electrode, the second solid-state electrolyte is located between the positive electrode and the second negative electrode, and a roughness of the second solid-state electrolyte is greater than a roughness of the first solid-state electrolyte;

wherein the roughness of the first solid-state electrolyte and the roughness of the second solid-state electrolyte are both greater than a surface roughness of the negative electrode, and a difference between the roughness of the second solid-state electrolyte and a roughness of the second negative electrode is greater than a difference between the roughness of the first solid-state electrolyte and a roughness of the first negative electrode; and wherein the difference between the roughness of the second solid-state electrolyte and the roughness of the second negative electrode is 100% to 500% greater than the difference between the roughness of the first solid-state electrolyte and the roughness of the first negative electrode.

2. The all-solid-state battery according to claim 1, wherein a cross-sectional area of the first negative electrode is larger than a cross-sectional area of the second negative electrode.

3. The all-solid-state battery according to claim 1, wherein the positive and negative electrodes further comprise current collectors, wherein materials of the current collectors independently comprise any one or a combination of at least two of aluminum, copper, nickel or zinc.

4. The all-solid-state battery according to claim 1, wherein a positive electrode active material layer of the positive electrode comprises a positive electrode active material;

optionally, the positive electrode active material comprises any one or a combination of at least two of $LiCoO_2$, $LiMnO_2$, $LiNiO_2$, $LiVO_2$, $LiNi_{1/3}CO_{1/3}$ $Mn_{1/3}O_2$, $LiMn_2O_4$, $LiTi_5O_{12}$, $Li(Ni_{0.5}Mn_{1.5})O_4$, $LiFePO_4$, $LiMnPO_4$, $LiNiPO_4$, $LiCoPO_4$ or $LiNbO_3$;

optionally, the positive electrode active material layer further comprises any one or a combination of at least two of a solid-state electrolyte material, a conductive material or an adhesive material;

optionally, the solid-state electrolyte material comprises a sulfide solid-state electrolyte material and/or an oxide solid-state electrolyte material;

optionally, the conductive material comprises any one or a combination of at least two of acetylene black, conductive carbon black, ketjen black or carbon fiber;

optionally, the adhesive material comprises any one or a combination of at least two of polyvinylidene fluoride, carboxymethylcellulose sodium or styrene-butadiene rubber;

optionally, a thickness of the positive electrode active material layer is 1 μm to 500 μm, optionally 50 μm to 200 μm;

optionally, a surface of the positive electrode active material layer is coated with a coating;

optionally, a material of the coating comprises any one or a combination of at least two of $LiNbO_3$, $Li_3PO_4$ or LiPON;

optionally, a thickness of the coating is 1 nm to 20 nm.

5. The all-solid-state battery according to claim 1, wherein a negative electrode active material layer of the negative electrode comprises a negative electrode active material;

optionally, the negative electrode active material comprises any one or a combination of at least two of a metallic active material, a carbon active material or an oxide active material;

optionally, the metallic active material comprises any one or a combination of at least two of Si, Sn, In, Si—Al alloy or Si—In alloy;

optionally, the carbon active material comprises any one or a combination of at least two of graphite, hard carbon or soft carbon;

optionally, the oxide active material comprises $Li_4Ti_5O_{12}$;

optionally, the negative electrode active material layer further comprises any one or a combination of at least two of a solid-state electrolyte material, a conductive material or an adhesive material;

optionally, the solid-state electrolyte material comprises a sulfide solid-state electrolyte material and/or an oxide solid-state electrolyte material;

optionally, the conductive material comprises any one or a combination of at least two of acetylene black, conductive carbon black, ketjen black or carbon fiber;

optionally, the adhesive material comprises any one or a combination of at least two of polyvinylidene fluoride, carboxymethylcellulose sodium or styrene-butadiene rubber;

optionally, a thickness of the negative electrode active material layer is 1 μm to 500 μm, optionally 50 μm to 200 μm;

optionally, the first negative electrode and the second negative electrode share a same current collector.

6. The all-solid-state battery according to claim 1, wherein a material of the solid-state electrolyte located between the positive electrode and the negative electrode comprises any one or a combination of at least two of a sulfide solid-state electrolyte material, an oxide solid-state electrolyte material or a polymer solid-state electrolyte material;

optionally, the thickness of the first solid-state electrolyte between the positive electrode and the negative electrode is 10 μm to 300 μm;

optionally, the thickness of the first solid-state electrolyte between the positive electrode and the optionally, the thickness of the first solid-state electrolyte between the positive electrode and the negative electrode is 20 μm to 60 μm.

7. The all-solid-state battery according to claim 1, wherein a numerical range of the roughness of the first solid-state electrolyte is 0.1 μm to 30 μm.

8. The all-solid-state battery according to claim 1, wherein a numerical range of the roughness of the second solid-state electrolyte is 0.1 μm to 50 μm.

9. The all-solid-state battery according to claim 1, wherein the first negative electrode is connected with the second negative electrodes.

10. The all-solid-state battery according to claim 1, wherein the second negative electrodes are located on both sides of the first negative electrode.

11. The all-solid-state battery according to claim 1, wherein a thickness of the first solid-state electrolyte is less than a thickness of each of second solid-state electrolytes.

12. The all-solid-state battery according to claim 1, wherein a thickness of the first negative electrode is greater than a thickness of each of the second negative electrodes.

13. The all-solid-state battery according to claim 1, wherein the difference between the roughness of the second solid-state electrolyte and the roughness of the second negative electrode is 200% to 300% greater than the difference between the roughness of the first solid-state electrolyte and the roughness of the first negative electrode;

optionally, the roughness of the second solid-state electrolyte is 30% to 150% greater than the roughness of the first solid-state electrolyte;

optionally, the roughness of the second negative electrode is greater than the roughness of the first negative electrode.

* * * * *

UNITED STATES PATENT AND TRADEMARK OFFICE
CERTIFICATE OF CORRECTION

| | |
|---|---|
| PATENT NO. | : 11,749,793 B2 |
| APPLICATION NO. | : 17/610618 |
| DATED | : September 5, 2023 |
| INVENTOR(S) | : Yuchuan Feng et al. |

It is certified that error appears in the above-identified patent and that said Letters Patent is hereby corrected as shown below:

In the Claims

At Column 16, Claim 6, Lines 17-18, delete, "optionally, the thickness of the first solid-state electrolyte between the positive electrode and the"

Signed and Sealed this
Fourteenth Day of November, 2023

Katherine Kelly Vidal
*Director of the United States Patent and Trademark Office*